US 12,240,922 B1

United States Patent
Raza et al.

(10) Patent No.: US 12,240,922 B1
(45) Date of Patent: Mar. 4, 2025

(54) TRANSITION METAL COMPLEX ASSISTED GREEN HYDROLYSIS FOR NANOCELLULOSE EXTRACTION

(71) Applicant: United Arab Emirates University, Al Ain (AE)

(72) Inventors: Mohsin Raza, Al Ain (AE); Basim Abu-Jdayil, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/672,453

(22) Filed: May 23, 2024

(51) Int. Cl.
   *C08B 1/00* (2006.01)
(52) U.S. Cl.
   CPC .................................. *C08B 1/003* (2013.01)
(58) Field of Classification Search
   CPC .................................................. C08B 1/003
   See application file for complete search history.

(56) References Cited

PUBLICATIONS

Paredes et al., Journal of Molecular Liquids, 2022, 367, article 120422, 12 pages. (Year: 2022).*
Wulandari et al., IOP Conf. Ser.: Mater. Sci. Eng., 2015, 107, article 012045, 7 pages. (Year: 2015).*
Al Hakkak et al., Advances in Materials Science and Engineering, 2019, article ID 2081027, 6 pages. (Year: 2019).*
Koshani et al., Journal of Agricultural and Food Chemistry, 2018, 66(29), p. 7692-7700. (Year: 2018).*

* cited by examiner

*Primary Examiner* — Jonathan S Lau
(74) *Attorney, Agent, or Firm* — MH2 Technology Law Group, LLP

(57) ABSTRACT

The present disclosure relates to an improvement in the process of hydrolysis of cellulose to produce nanocellulose using imidazolium-based ionic liquids with short alkyl chains in the presence of transition metal complex and an oxidizing agent.

18 Claims, 2 Drawing Sheets

US 12,240,922 B1

TRANSITION METAL COMPLEX ASSISTED GREEN HYDROLYSIS FOR NANOCELLULOSE EXTRACTION

TECHNICAL FIELD

The present disclosure relates to the field of nanocellulose, in particular to a process for preparation of nanocellulose. More particularly, the present disclosure relates to an improvement in the process of hydrolysis of cellulose to produce nanocellulose using imidazolium-based ionic liquids with short alkyl chains in the presence of transition metal complex and an oxidizing agent.

BACKGROUND OF INVENTION

Nanocellulose is a natural biopolymer that is obtained from waste materials containing cellulose. The conversion of cellulose to nanocellulose involves hydrolysis of cellulose fibers into nanoscale dimensions. Nanocellulose has attracted significant attention due to its unique properties, such as high strength, biodegradability, and renewability. Nanocellulose offers numerous advantages over microcellulose, including excellent mechanical properties, high surface area and biodegradability, making it a valuable resource for wide range of applications including composites, films, coatings, and biomedical materials.

Common methods for hydrolysis of cellulose include acid hydrolysis, enzymatic hydrolysis, ionic liquid hydrolysis, catalytic hydrolysis, etc. The limitations associated with sulfuric acid and hydrochloric acid hydrolysis are corrosion of equipment, non-recovery of the acid, toxic pollutants, expensive waste disposal, excessive water consumption and degradation of cellulose, resulting in lower yield. Recent research patterns have suggested ionic liquids as a promising and environmentally friendly approach for the hydrolysis of cellulose.

Ionic liquids are salts that are liquid at relatively low temperatures, and they have been studied for their ability to dissolve cellulose effectively. Ionic liquids are known for their low melting point, low volatility and high thermal stability compared to conventional molecular solvents, and hence, are termed as green solvents. They have established themselves as hydrolysing solvents for cellulose termed as green hydrolysis. They offer several advantages for cellulose hydrolysis, including high cellulose solubility, high selectivity for cellulose, and the ability to operate at lower temperatures compared to traditional methods. However, challenges remain, such as improvement in the hydrolysis efficiency for effective breakdown of cellulose into nano-sized fibers to improve the yield of nanocellulose material and cost optimization.

1-butyl-3-methylimidazolium chloride [Bmim][Cl] is an imidazolium-based ionic liquid with short alkyl chain with a combination of chloride as the anion and butyl side chains on the methylimidazolium core, which together advance its ability to dissolve cellulose. Phanthong et al. in Cellulose, vol. 24, pp. 2083-2093, 2017, and RSC advances, vol. 10, no. 65, pp. 39413-39424, 2020 produced nanocellulose using [Bmim][Cl] mixed with $H_2SO_4$. In AMCT 2017, Malaysisa, p. 422, cellulose was treated with [Bmim][Cl] extracted from Mahang wood to produce microcrystalline cellulose. Despite its ability to dissolve cellulose, [Bmim][Cl] is limited to producing either microcrystalline cellulose with mechanical assistance or nanocellulose when microcrystalline cellulose is used as a starting material or in combination with mild mineral acids.

Improving the hydrolysis capacity of [Bmim][Cl] and similar imidazolium-based ionic liquids with short alkyl chains is crucial for the efficient production of nanocellulose without the need for mineral acid addition or mechanical co-treatment. Therefore, there is a need for further research and investigation to improve the hydrolysis capacity of imidazolium-based ionic liquid with short alkyl chains as a green solvent while simultaneously improving yield, both of which are critical factors for the efficiency of hydrolysis media.

Transition metal complexes containing metals such as copper, iron or chromium exhibit catalytic properties that facilitate the degradation of lignocellulosic materials. These complexes utilise the redox capabilities of transition metals to facilitate electron transfer reactions leading to oxidative reactions and cleavage of chemical bonds in biomass. While transition metal complexes have been shown to be effective in fractionating lignocellulose into cellulosic and lignin streams, their role as catalysts is primarily limited to this fractionation process, which often involves a two-step treatment with initial delignification with sodium hydroxide and subsequent treatment with a metal complex (copper sulphate and bipyridine) in alkaline media.

Therefore, there is a need to provide an improved process to produce nanocellulose by green solvent hydrolysis.

SUMMARY OF THE INVENTION

In one aspect, the present disclosure provides a process for the preparation of nanocellulose. The process comprises hydrolysing cellulose with an imidazolium-based ionic liquid with short alkyl chains in the presence of a transition metal complex, and an oxidizing agent.

In another aspect, the present disclosure provides nanocellulose prepared by the process of the preceding aspect.

In yet another aspect, the present disclosure provides use of the nanocellulose produced by the process of the present disclosure in nanocellulose production plants, waste management companies, environmental and sustainability organizations, and research centres.

BRIEF DESCRIPTION OF THE ACCOMPANYING FIGURES

In order that the disclosure may be readily understood and put into practical effect, reference will now be made to exemplary embodiments as illustrated with reference to the accompanying figures. The figures together with detailed description below, are incorporated in and form part of the specification, and serve to further illustrate the embodiments and explain various principles and advantages, in accordance with the present disclosure where:

DETAILED DESCRIPTION

Figure 1:
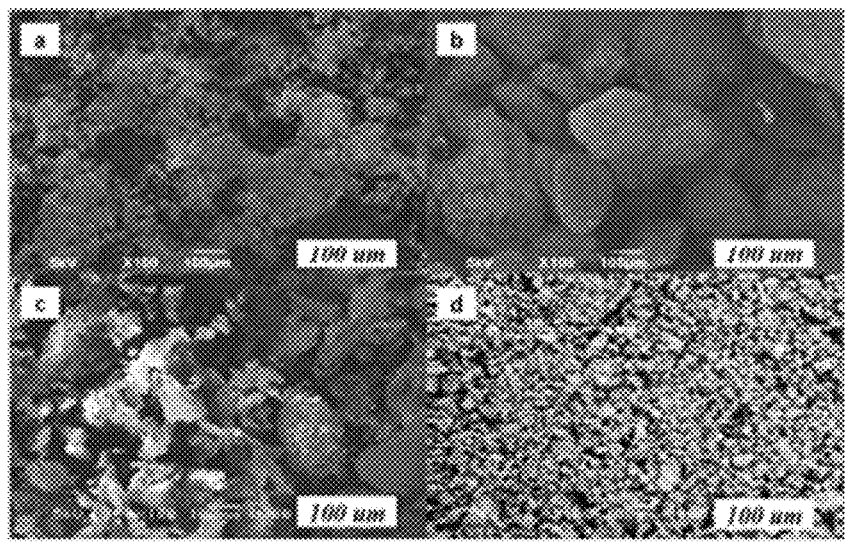
FIG. 1 illustrates SEM images for (a)—Date seeds, (b)—cellulose, (c)—Micro crystalline cellulose, and (d)—Nano cellulose.

The present disclosure is directed to a process for the preparation of nanocellulose by the hydrolysis of cellulose with an imidazolium-based ionic liquid with short alkyl chains in the presence of a transition metal complex, and an oxidizing agent.

In one embodiment of the present disclosure, there is provided, a cost-effective and efficient process for the preparation of nanocellulose. This process results in the extraction of nanocellulose with a 25% higher yield compared to known methods, while remaining environmentally friendly.

The present disclosure can be understood more readily by reference to the following description taken in connection with the accompanying Figures and Examples, all of which form a part of this disclosure.

At the very outset of the detailed description, it may be understood that the ensuing description only illustrates a particular form of this invention. However, such a particular form is only an exemplary embodiment, and without intending to imply any limitation on the scope of this invention. Accordingly, the description is to be understood as an exemplary embodiment and teaching of invention and not intended to be taken restrictively.

Before the present disclosure or methods of the present disclosure are described in greater detail, it is to be understood that the specific products, methods, processes, conditions, or parameters, are not limited to particular embodiments described, as such may, of course, vary. It is also to be understood that the terminology used herein is for the purpose of describing particular embodiments only, and is not intended to be limiting, since the scope of the methods will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the methods. The upper and lower limits of these smaller ranges may independently be included in the smaller ranges and are also encompassed within the methods, subject to any specifically excluded limit in the stated range.

The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number. For example, "about" can mean within one or more standard deviations, or within ±30%, 25%, 20%, 15%, 10% or 5% of the stated value.

Unless defined otherwise, all technical and scientific terms used herein have the same meaning as commonly understood by those of ordinary skill in the art to which the invention belongs. Although any methods and materials similar or equivalent to those described herein can be used in the practice or testing of the present invention, preferred methods and materials are described. For the purposes of the present invention, the following terms are defined below.

As will be apparent to those of skill in the art upon reading this disclosure, each of the individual embodiments described and illustrated herein has discrete components and features which may be readily separated from or combined with the features of any of the other several embodiments without departing from the scope or spirit of the present methods. Any recited method can be carried out in the order of events recited or in any other order which is logically possible.

The articles "a" and "an" are used herein to refer to one or to more than one (i.e., to at least one) of the grammatical object of the article. By way of example, "an element" means one element or more than one element.

As used herein, the term "comprises", "comprising", or "comprising of" is generally used in the sense of include, that is to say permitting the presence of one or more features or components. The term "comprises", "comprising", or "comprising of" when placed before the recitation of steps in a process or method means that the process or method encompasses one or more steps that are additional to those expressly recited, and that the additional one or more steps may be performed before, between, and/or after the recited steps.

Reference throughout this specification to "certain embodiments", "further embodiments", "some embodiments", "one embodiment", "an embodiment", "a non-limiting embodiment", "an exemplary embodiment", means that a particular feature, structure, or characteristic described in connection with the embodiment may be included in at least one embodiment of the present disclosure. It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination.

The use of any and all examples, or exemplary language (e.g., "such as") provided with respect to certain embodiments herein is intended merely to better illustrate the disclosure and does not pose a limitation on the scope of the disclosure otherwise claimed.

The terms "process(es)" and "method(s)" are considered interchangeable within this disclosure.

In one embodiment, the present disclosure provides a process for the preparation of nanocellulose. The process comprises hydrolysing cellulose with an imidazolium-based ionic liquid with short alkyl chains in the presence of a transition metal complex, and an oxidizing agent.

The source of cellulose employed for the purposes of the present disclosure may be any kind of cellulose obtained from wood pulp, non-wood plants, wood, and agricultural residues. In a specific embodiment, the cellulose is cellulose fibers obtained from date seeds.

The imidazolium-based ionic liquids with short alkyl chains for the purposes of the present invention may be selected from 1-Ethyl-3-methylimidazolium chloride (Emim[Cl]), Propyl-3-methylimidazolium chloride (Pmim[Cl]), and 1-Butyl-3-methylimidazolium chloride (Bmim[Cl]).

In a specific embodiment, the ionic liquid is Bmim[Cl].

Ionic liquids with shorter alkyl chains have higher solubility for cellulose. The shorter alkyl chains provide better access to the hydroxyl groups in cellulose, allowing for stronger interactions and improved dissolution. Ionic liquids with shorter alkyl chains typically have lower viscosity, which facilitates better mixing and mass transfer during the cellulose dissolution process. Lower viscosity also improves the handling and processing of the ionic liquid-cellulose mixture.

In certain embodiments, the ratio of cellulose to the ionic liquid may range from about 1:10 to about 1:100, about 1:10 to about 1:50, or about 1:10.

The transition metal complex comprises a complex of a transition metal selected from copper, iron, nickel, zinc, manganese and the like, coordinated with a ligand. The transition metals can be employed in the form of their salts, chlorides, or oxides, such as copper nitrate, iron chloride, iron oxide, copper chloride, nickel chloride, manganese chloride, and the like.

Suitable ligands include, but are not limited to, N-donor ligands, such as pyridine, phenanthroline, EDTA, ethylene diamine, diethylene tetraamine, and the like.

In a specific embodiment, the transition metal complex is a transition metal complex containing an aromatic N-donor ligand. In a further specific embodiment, the transition metal complex is a transition metal complex comprising copper nitrate, and pyridine as ligand.

The mass percentage ratio of the transition metal complex to the cellulose may range from about 0.01:1 to about 0.1:1. In some embodiments, the mass percentage ratio of the transition metal complex to the cellulose is about 0.01:1.

The oxidizing agent may be selected from hydrogen peroxide, ozone, sodium hypochlorite, potassium permanganate, nitric acid, peracetic acid, chlorine dioxide, and the like.

The concentration of the oxidizing agent may be form about 0.01-100%. In some embodiments, the concentration of the oxidizing agent is about 0.01-20%, about 0.5-20%, or about 0.5-10%, in water. The molar ratio of the oxidizing agent to cellulose may range from about 0.01:1 to 10:1.

In a specific embodiment, the oxidizing agent is hydrogen peroxide ($H_2O_2$). The concentration of $H_2O_2$ is about 0.01-100%, about 0.01-75%, about 0.01-50%, or about 0.01-25%, in water. In some embodiments, the concentration of $H_2O_2$ is about 0.5-25%, about 0.5-20%, or about 0.5-10%, in water. In some instances, the concentration of $H_2O_2$ about 0.5-50%.

In certain embodiments, the volume/mass ratio $H_2O_2$ to the cellulose is from about 0.01 ml/g to about 10 ml/g, or about 0.01 ml/g to about 5 ml/g.

In certain embodiments, the hydrolysis may be conducted at a temperature of about 60° C. to about 150° C. for about 1 to about 20 hours. In some embodiments, the hydrolysis may be conducted at a temperature of about 60° C. to about 120° C. for about 30 minutes to about 24 hours. In an embodiment, the hydrolysis is conducted at a temperature of about 100° C. for about 3 hours.

In an embodiment, the process for the preparation of nanocellulose comprises steps of terminating the hydrolysis. The hydrolysis may be terminated by adding a solvent selected from water, alcohol (such as ethanol, methanol, and the like), acetone and a mixture thereof. In some embodiments, the hydrolysis is terminated by adding DI water. The termination may be performed at a temperature of about 4° C. or below.

After the termination of the hydrolysis, the process further comprises the steps of centrifugation, and sonication.

The centrifugation may be conducted at a speed of about 1000 rpm to about 10000 rpm for 1 to 5 hours to separate the hydrolyzed mixture. In certain embodiments, the centrifugation is conducted at a speed of about 3000 rpm to about 5000 rpm for about 1 to about 3 hours to separate the hydrolyzed mixture.

The sonication process may be carried out for a duration of about 30 minutes to about 1 hour at about 20 kHz to about 100 kHz. In an embodiment, the sonication process is carried out for a duration of about 30 to about 60 minutes.

After the sonication, the process comprises a step of removing unhydrolyzed cellulose or fibres from the mixture. The unhydrolyzed cellulose or fibres may be removed by any method known to a person skilled in the art, such as by filtering such as vacuum filtration, and the like. During the process of filtration, the unhydrolyzed cellulose stays on filter paper and micro-fibres and nano-fibres pass. In a specific embodiment, the unhydrolyzed fibres are removed by vacuum filtration.

In an embodiment, the nanocellulose obtained in the process may undergo drying to remove any solvent or moisture present. Any drying technique known to a person skilled in the art may be employed. In a specific embodiment, nanocellulose is dried using freeze drying. The parameters such as time, temperature, and pressure for freeze drying are not particularly limited, provided that the solvent or moisture can be adequately eliminated to yield dry nanocellulose. In an embodiment, the drying temperature is maintained below about 0° C., with temperatures of about −60° C., about −65° C., or about −70° C. being optimal. The duration of the freeze-drying process can vary widely depending on the sample size, solvent or moisture content, and other factors. It can range from a few hours to several days.

In a specific embodiment, the process for preparation of nanocellulose comprises the steps of:
a) providing a solution comprising cellulose in an imidazolium-based ionic liquid with a short alkyl chain; wherein the imidazolium-based ionic liquid with a short alkyl chain is selected from a group comprising Emim[Cl], Pmim[C], and 1 Bmim[Cl];
b) adding a transition metal complex to the solution obtained in step a);
c) adding an oxidizing agent to the mixture obtained in step b);
d) conducting hydrolysis of the mixture obtained in step c) at a temperature of about 60° C. to about 120° C.;
e) terminating the hydrolysis;
f) centrifugating the reaction mixture obtained in step e);
g) sonicating the centrifuged mass obtained in step f); and
h) filtering the sonicated mixture and drying to obtain the nanofibers.

Source of cellulose employed for the purposes of the present disclosure in step a) may be any kind of cellulose obtained from wood pulp, non-wood plants, wood, and agricultural residues. In a specific embodiment, the cellulose is cellulose fibres obtained from date seeds.

The ratio of cellulose to the ionic liquid employed in step a) may range from about 1:10 to about 1:100, about 1:10 to about 1:50, or about 1:10.

The transition metal complex employed in step b) comprises a complex of a transition metal selected from copper, iron, nickel, zinc, manganese and the like coordinated with a ligand. The transition metals can be employed in the form of their salts, chlorides or oxides, such as copper nitrate, iron chloride, iron oxide, copper chloride, nickel chloride, manganese chloride and the like.

Suitable ligands include but are not limited to, N-donor ligands such as pyridine, phenanthroline, EDTA, ethylene diamine, diethylene tetraamine and the like.

In a preferred embodiment, the transition metal complex is transition metal complex comprising copper metal, and pyridine as ligand.

The mass percentage ratio of the transition metal complex to the cellulose may range from about 0.01:1, or from about 0.01 to 0.1.

The oxidizing agent may include, but is not limited to, hydrogen peroxide, ozone, sodium hypochlorite, potassium permanganate, nitric acid, peracetic acid, chlorine dioxide and the like The concentration of the oxidizing agent may range from about 0.01 to about 100 percent to the total concentration of the reaction mixture. In some embodiments, the concentration of the oxidizing agent is about 1-20%, about 0.5-20%, or about 0.5-10%, in water. The molar ratio of the oxidizing agent to cellulose may range from about 0.01:1 to 10:1.

In a specific embodiment, the oxidizing agent is hydrogen peroxide. The concentration of $H_2O_2$ is about 0.01-100%, about 0.01-75%, about 0.01-50%, or about 0.01-25%, in water. In some embodiments, the concentration of $H_2O_2$ is about 0.5-25%, about 0.5-20%, or about 0.5-10%, in water. In some instances, the concentration of $H_2O_2$ about 0.5-50%.

In certain embodiments, the volume/mass ratio $H_2O_2$ to the cellulose is from about 0.01 ml/g to about 10 ml/g, or about 0.01 ml/g to about 5 ml/g.

The hydrolysis in step d) can be conducted at a temperature of about 60° C. to about 150° C. for about 1 to about 20 hours, preferably, at a temperature of about 60 to about 120° C. for about 2 to about 10 hours, and most preferably, at a temperature of about 100° C. for about 3 hours.

The product can be extracted in step e) after termination of hydrolysis by pouring excess solvent. The solvent may be selected from water, alcohol (such as ethanol, methanol, and the like), acetone and a mixture thereof. In some embodiments, the hydrolysis is terminated by adding DI water. The termination may be performed at a temperature of about 4° C. or below. The temperature of extraction may range from about 4° C. or below.

The hydrolyzed product is subjected to centrifugation to reduce the size distribution of the extracted nanocellulose. The centrifugation conditions in step f) is about 1000 rpm to about 10000 rpm for about 1 to 5 hours, preferably, about 3000 rpm to about 5000 rpm for about 1 to 3 hours, and most preferably, about 4000 rpm for 1 hour. The centrifugation can be carried out at low-speed multiple times, or initially at low speed of about 4000 rpm and then at high speed.

The centrifuged mass can be subjected to sonication. Sonication in step g) can be conducted in a device capable of delivering high-frequency sound waves, typically in the range of about 20 kHz to several MHz, preferably, from about 20 kHz to about 100 kHz. A solvent can be employed to disperse the cellulose fibres. The solvent for this purpose may be selected from water. Sonication is carried out for sufficient amount of time to achieve the desired level of fibrillation. Sonication can be conducted for a few minutes to several hours, preferably, sonication is carried out for about 30 minutes to one hour.

The final product can be vacuum filtered and dried. Drying in step h) can be carried out by freeze drying at typically below 0° C. to keep the sample frozen. The duration of the freeze-drying process can vary widely depending on the sample size, moisture content, and other factors. It can range from a few hours to several days. In a specific embodiment, the centrifuged mass is dispersed in a solvent or suspension that is compatible with freeze drying.

After freeze drying, the product can be stored in airtight containers to prevent rehydration.

In a further specific embodiment, the process for preparation of nanocellulose comprises the steps of:
a) providing a solution comprising cellulose in [Bmim][Cl];
b) adding a transition metal complex comprising copper nitrate and pyridine as ligand to the solution of step a);
c) adding hydrogen peroxide as oxidizing agent to the mixture obtained in step b); and
d) hydrolysing the mixture obtained in step c) at a temperature of about 100° C.;
e) termination of the hydrolysis process by adding DI water;
f) centrifugating the reaction mixture obtained in step e) at a speed of about 4000 rpm;
g) sonicating the centrifuged mass obtained in step f); and
h) filtering the sonicated mixture and drying to obtain nanofibers.

The process conditions for this specific embodiment are the same as that defined for the above specific embodiment.

Imidazolium-based ionic liquids with short alkyl chains offer the advantage of efficient recovery after hydrolysis, which can be reused more than about 90% over four cycles without losing activity. In addition, the ability to change the cation/anion combinations offers versatility. This affects the dimensions and morphology of the nanocellulose.

The process provided in the present disclosure improves the hydrolysis efficiency of imidazolium-based ionic liquids with short alkyl chains to produce nanocellulose, whose hydrolysis capacity is otherwise limited to the extraction of microcrystalline cellulose. For this purpose, a transition metal complex is used together with an oxidizing agent.

In the process, the ligand, and in particular, the aromatic N-donor ligand enhances the penetration of metal ions into the cell wall structure of cellulose fibres. This facilitation aids in the localization of hydroxyl radicals generated from hydrogen peroxide, effectively removing amorphous regions of cellulose fibres, and reducing the size to the nanometer scale. The addition of transition metal complex and oxidizing agent improves efficiency of imidazolium-based ionic liquids with short alkyl chain to produce nanosized fibres, otherwise capacity of the imidazolium-based ionic liquids with short alkyl chains in hydrolysis is limited to produce microsized fibres. This process of the present disclosure has the potential to revolutionize the nanocellulose production industry by improving the yield and nano-size through green solvent hydrolysis.

The process of the present disclosure results in an increased efficiency of hydrolysis by ionic liquids and is environmentally friendly. The process resulted in an about 25% higher yield compared to known processes and nanosized fibres.

Figure 2:
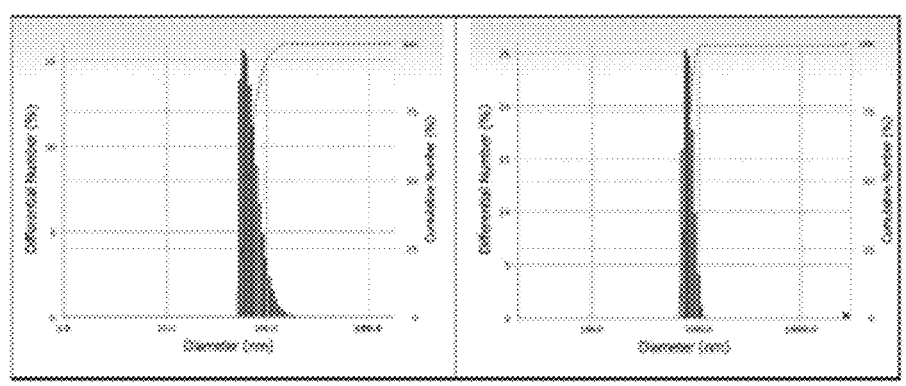
FIG. 2 illustrates particle size distribution of nanocellulose (NC) (LHS) and microcrystalline cellulose (MCC) (RHS).

In another aspect, the present disclosure provides the nanocellulose material prepared according to the process of the present disclosure. In an embodiment, the nanocellulose prepared by the process of the present disclosure having a particle size of about 100 nm to about 200 nm. FIG. 2 shows the particle size distribution of microcrystalline cellulose and nanocellulose.

In yet another embodiment, the present disclosure provides use of the nanocellulose produced according to the process of the present disclosure in nanocellulose production plants, waste management companies, environmental and Sustainability organizations, and research centres. The existing nanocellulose production plants employing mineral acids or ionic liquids can incorporate the method of present invention to improve nanocellulose yield and further reduce nanocellulose size.

The present disclosure is further described with reference to the following examples, which are only illustrative in nature and should not be construed to limit the scope of the present disclosure in any manner.

EXAMPLES

Materials Characterization:
Measurement of Particle Size of Nanocellulose:

Dynamic light scattering (DLS) is employed for measuring the diameter of spherical particles. This consistency can be confirmed by the SEM results, which reinforce the confidence in using DLS to measure the average size of particles.

Example 1: Synthesis of Nanocellulose from Date Seeds

A copper metal complex consisting of 5 mg of copper nitrate and 5 mg of pyridine was added to a solution containing 1 gram of cellulose obtained from date seeds dissolved in 10 mL of 1-butyl-3-methylimidazolium chloride [Bmim][Cl]. Additionally, 1.65 ml of 10 v/v % hydrogen peroxide was added. Hydrolysis was performed at 100° C. for 3 hours. Termination of the hydrolysis process involved adding 10-fold DI water at 4° C., forming white precipitates. After centrifugation (4000 rpm; 4 times), nanofibers were sonicated and vacuum filtered to remove unhydrolyzed fibers, and the final step included freeze-nanocellulose.

Further, determination of the importance of presence of the copper metal complex and $H_2O_2$ during the green hydrolysis of cellulose was carried out using central composite design (CCD) implemented in the Minitab statistical software. The result measured was the yield of both microcrystalline cellulose (MCC) and nanocellulose (NC).

Table 1 illustrates the CCD design, presenting the data in its original, uncoded form for enhanced comprehension. The two-factorial, two-stage CCD experimental design encompassed 13 experimental runs, featuring four factorial points, four axial points, and five mean points, to determine the pure error (experimental error).

TABLE 1

CCD for optimizing copper metal complex-assisted [Bmim]Cl hydrolysis

| StdOrder | Cu—py (1:1) (mg) | $H_2O_2$ (ml) | Yield (%) |
| --- | --- | --- | --- |
| 1 | 0 | 0.0 | 72.00 |
| 2 | 10 | 0.0 | 76.00 |
| 3 | 0 | 5.0 | 74.55 |
| 4 | 10 | 5.0 | 89.99 |
| 5 | 0 | 2.5 | 75.11 |
| 6 | 10 | 2.5 | 93.00 |
| 7 | 5 | 0.0 | 82.10 |
| 8 | 5 | 5.0 | 92.25 |
| 9 | 5 | 2.5 | 91.88 |
| 10 | 5 | 2.5 | 91.21 |
| 11 | 5 | 2.5 | 91.97 |
| 12 | 5 | 2.5 | 92.50 |
| 13 | 5 | 2.5 | 92.29 |

Figure 3:
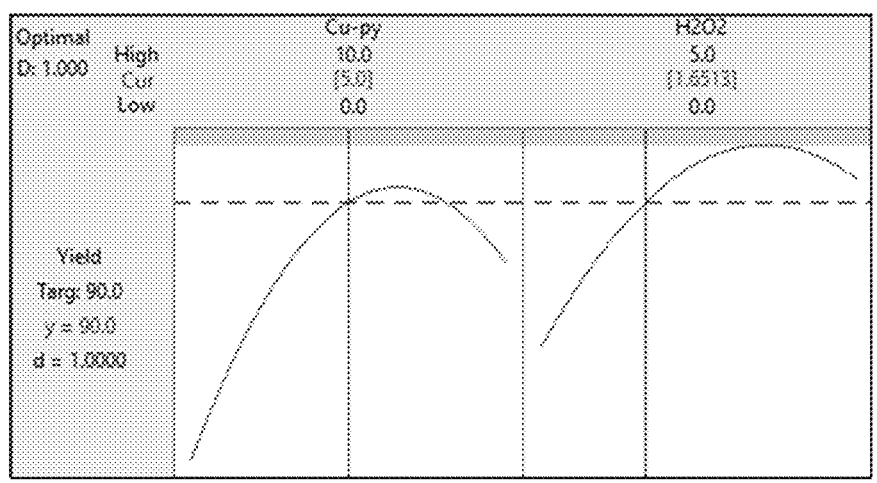
FIG. 3 illustrates experimental results for optimized quantities of copper metal complex and $H_2O_2$.

The amount of the copper metal complex was 10 mg (Cu:py=5 mg:5 mg) and $H_2O_2$ was 1.65 ml (10 v/v % solution of $H_2O_2$), as depicted in FIG. 3. The yield of nanocellulose was optimum when the hydrolysis was conducted in the presence of [Bmim][Cl], copper metal complex and $H_2O_2$.

Comparative Examples

The hydrolysis of cellulose obtained from date seeds was carried out using a process similar to Example 1. However, the process was performed without using copper metal complex and hydrogen peroxide, and without hydrogen peroxide. 1 gram of cellulose was added to 10 ml [Bmim][Cl], and hydrolysis occurred at 100° C. for 3 hours. Termination involved adding 10-fold DI water at 4° C., forming white precipitates. After centrifugation (4000 rpm; 4 times), microfibers were sonicated and vacuum filtered to remove unhydrolyzed fibers, and the final step included freeze drying at −65° C. yielding cellulosic microfibers. The results are provided in Table 1:

By utilizing [Bmim][Cl] as a green solvent in combination with the copper metal complex and hydrogen peroxide, this process of the present disclosure achieves a remarkable increase of about 25% in yield compared to using [Bmim][Cl] alone. [Bmim][C] hydrolysis alone was limited to the production of microfibers, whereas the addition of the copper metal complex and hydrogen peroxide enables the production of nanocellulose.

The calculation of the yield provides information on the efficiency of the hydrolysis process. According to equation 1 below:

$$Yield = \frac{Amount\ of\ MCC/NC\ after\ freex\ drying\ (gm)}{Amount\ of\ cellulose\ used\ for\ hydrolysis\ (gm)} \times 100 \quad \text{Equation 1}$$

As shown in the Table 1, hydrolysis with [Bmim]Cl in the absence of a copper metal complex and $H_2O_2$ yielded only 72% microcellulose fibers as a substantial proportion of the particles remained unhydrolyzed and were subsequently removed by filtration. When [Bmim]Cl was combined with the copper metal complex, the yield increased to 76%. Similarly, when [Bmim]Cl was combined with $H_2O_2$, the yield reached 75%. Remarkably, the combination of copper metal complex and $H_2O_2$ together with [Bmim]Cl resulted in a significantly higher yield of 93%, leaving only a negligible amount of non-hydrolysed fibers. Addition of [Bmim]Cl and $H_2O_2$ showed synergistic effects in improving yield with improved hydrolysis efficiency.

FIG. 1 shows the morphological assessment of date seeds (DS) and extracted fibers at different phases of treatment. In FIG. 1-(a), the date seeds show a coarse structure characterized by tightly encapsulated cellulose fibers into lignin, a non-polysaccharide biopolymer. This lignin acts as a protective barrier fiber that are delignified and bleached. The fibers become clearer and show a spherical morphology. FIG. 1-(c) shows the microcrystalline cellulose fibers (MCC) after hydrolysis with only [Bmim][Cl]. The fibers were reduced in size and show swallowed particles. In FIG. 1-(d), the hydrolysis of [Bmim][Cl], assisted by the copper metal complex and hydrogen peroxide, significantly reduces the size of the cellulose fibers. The resulting spherical nanocellulose (NC) exhibits a uniform particle size distribution, indicating a remarkable increase in the hydrolysis capacity of [Bmim][Cl] incorporated with copper metal complex and hydrogen peroxide to decrease the size of resulting fibers.

Microcrystalline cellulose, and nanocellulose exhibited average particle diameters of about 1.2 μm (1200 nm) and about 128.7 nm, respectively. The [Bmim][Cl] hydrolysis assisted by a copper metal complex and hydrogen peroxide brought the fibers size to about 100 nm.

Figure 4:
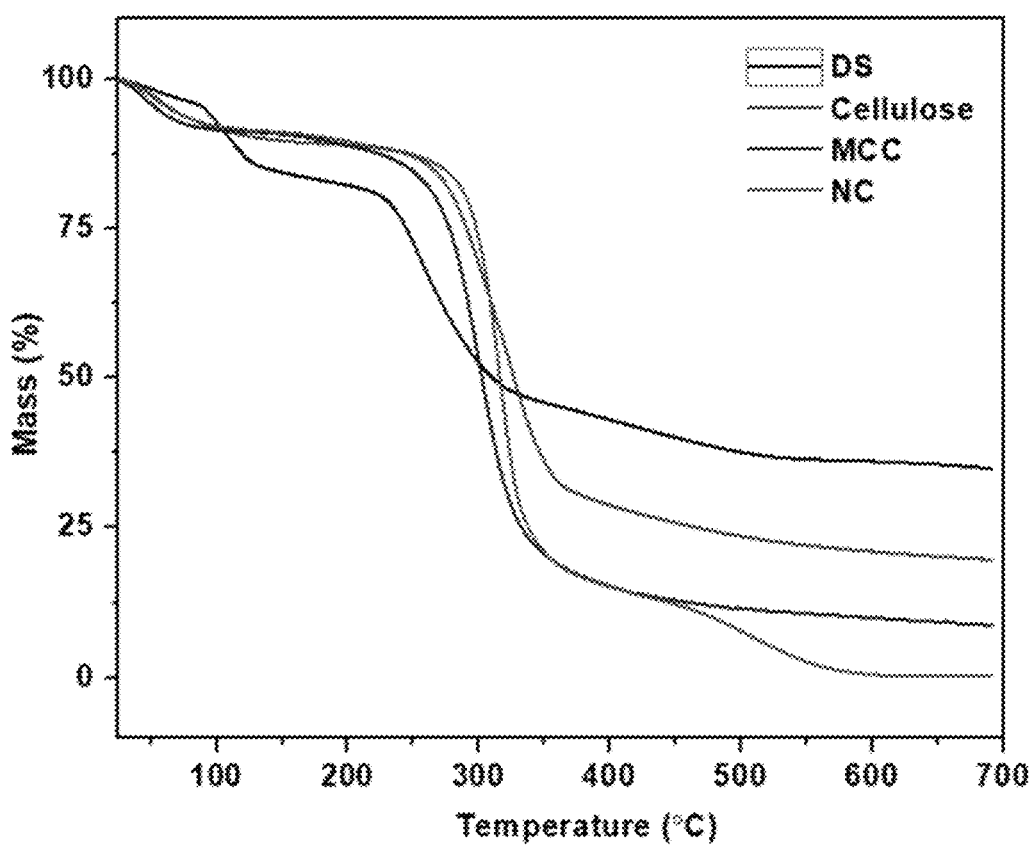
FIG. 4 illustrates TGA curves for date seeds (DS), cellulose, microcrystalline cellulose (MCC), and nanocellulose (NC).

Thermal Stability:

FIG. 4 shows the thermal decomposition curves for DS, cellulose, MCC, and NC. The decomposition behavior can be divided into three different areas: Dehydration, devolatilization and carbonization. Table 2 shows the thermal decomposition properties of the fibers for each treatment stage. DS, the untreated lignocellulosic material, exhibited an initial decomposition temperature ($T_{onset}$) of 230° C., with a mass loss of 30.78% in the devolatilization stage. In the carbonization region, DS produced the highest biochar content (34.74%), which is attributed to its untreated nature and abundant lignin, a known biochar-forming component. Cellulose showed an improved $T_{onset}$ at 275° C. In the devolatilization region, the mass loss increased to 50.78%, which is associated with the accumulation of cellulose. The biochar content reduced to 19.67% indicates effective delignification in the process. The MCC resulting from [Bmim] Cl hydrolysis have a $T_{onset}$ of 270° C., which is slightly lower than that of cellulose fibers. This is attributed to the cleavage of the cellulose chain, which results in shorter, more reactive fragments and changes the cellulose structure. (Huang et al., 2019) also reported a similar reduction in the $T_{onset}$ during hydrolysis of cotton-linter-based cellulose as a precursor using [Bmim]Cl. In the devolatilization region, the mass loss increased to 59.10%, which was accompanied by a further accumulation of cellulose. The biochar content decreased further to 8.6%. Interestingly, the NC produced with copper catalyst+$H_2O_2$-assisted [Bmim]Cl hydrolysis exhibited the highest $T_{onset}$ at 286° C., indicating increased thermal stability. This indicates that the presence of the copper catalyst together with $H_2O_2$ likely enables a more controlled and efficient decomposition of cellulose resulting in a higher $T_{onset}$. The maximum mass loss in the devolatilization region (61.80%) shows that the fibers were highly enriched with cellulose. Consequently, only 0.36% lignin remains, indicating simultaneous lignin decomposition during [Bmim]Cl assisted hydrolysis.

TABLE 2

Thermal characteristic properties of DS, B&D fibers, microfibers, and nanocellulose.

| Fibers | $T_{onset}$ (° C.) | $T_f$ (° C.) | % Devolatilization | % Char | $T_{max}$ (° C.) |
| --- | --- | --- | --- | --- | --- |
| DS (Date seeds) | 230 | 317 | 30.78 | 34.74 | 253 |
| Cellulose | 275 | 358 | 50.78 | 19.67 | 321 |
| MCC | 270 | 353 | 59.10 | 8.7 | 303 |
| NC | 286 | 357 | 61.80 | 0.36 | 318 |

We claim:

1. A process for preparation of nanocellulose comprising hydrolysing cellulose with an imidazolium-based ionic liquid with short alkyl chains in the presence of a transition metal complex, and an oxidizing agent.

2. The process as claimed in claim 1, wherein the imidazolium-based ionic liquid with short alkyl chains is selected from 1-Ethyl-3-methylimidazolium chloride (Emim[Cl]), Propyl-3-methylimidazolium chloride (Pmim[Cl]), and 1-Butyl-3-methylimidazolium chloride (Bmim[Cl]).

3. The process as claimed in claim 1, wherein the transition metal complex comprises a transition metal selected from copper, iron, nickel, zinc, and manganese in the form of their salts, chlorides or oxides with a ligand.

4. The process as claimed in claim 1, wherein the ligand is selected from pyridine, phenanthroline, EDTA, ethylene diamine, and diethylene tetraamine.

5. The process as claimed in claim 1, wherein the transition metal complex is selected from a transition metal complex consisting of a copper nitrate and aromatic N-donor ligand pyridine.

6. The process as claimed in claim 1, wherein the oxidizing agent is selected from hydrogen peroxide, ozone, sodium hypochlorite, potassium permanganate, nitric acid, peracetic acid, and chlorine dioxide.

7. The process as claimed in claim 1, wherein the oxidizing agent is hydrogen peroxide.

8. The process as claimed in claim 1, wherein the molar ratio of cellulose to the ionic liquid ranges from about 1:10 to about 1:100.

9. The process as claimed in claim 1, wherein the molar ratio of the transition metal complex to cellulose ranges from 0.01:1.

10. The process as claimed in claim 1, wherein the concentration of the oxidising agent to the total concentration of the reaction mixture in volume/mass percent is from 1 to 20%.

11. The process as claimed in claim 1, wherein the hydrolysis is conducted at a temperature of about 60° C. to about 120° C.

12. The process as claimed in claim 1, wherein the process further comprises centrifugation, and sonication.

13. The process as claimed in claim 12, wherein the centrifugation is conducted at a speed of 1K to 10 K for 1 to 5 hours to separate the hydrolyzed mixture; and the sonication process is carried out for a duration of about 30 to about 60 minutes at about 20 kHz to about 100 kHz to facilitate the disruption of nanofibers.

14. The process as claimed in claim 1, wherein the process comprises the steps of:
   a) providing a solution comprising cellulose in an imidazolium-based ionic liquid with a short alkyl chain selected from Emim, Pmim, and Bmim[Cl];
   b) adding a transition metal complex to the solution obtained in step a);
   c) adding an oxidizing agent to the mixture obtained in step b);
   d) conducting hydrolysis of the mixture obtained in step c) at a temperature of about 60° C. to 120° C.;
   e) terminating the hydrolysis;
   f) centrifugating the reaction mixture obtained in step e);
   g) sonicating the centrifuged mixture obtained in step f); and
   h) filtering the sonicated mixture and drying to obtain the nanofibers.

15. The process as claimed in claim 14, wherein the transition metal complex in step a) is selected from a complex comprising transition metal selected copper, iron, nickel, zinc, and manganese in the form of their salts, chlorides or oxides with a ligand selected from pyridine, phenanthroline, EDTA, ethylene diamine, and diethylene tetraamine.

16. The process as claimed in claim 14, wherein the oxidizing agent is hydrogen peroxide.

17. The process as claimed in claim 14, wherein the ratio of cellulose to the ionic liquid ranges from about 1:10 to about 1:100; the molar ratio of the transition metal complex to cellulose ranges from 0.01:1; and the amount of oxidizing agent in volume/mass percent ranges from about 1 to about 20 percent to the total concentration of the reaction mixture.

18. A process for preparation of nanocellulose comprising the steps of:
   a) providing a solution comprising cellulose in [Bmim]Cl;
   b) adding a transition metal complex comprising copper metal and pyridine as ligand to the solution of step a);
   c) adding hydrogen peroxide as oxidizing agent to the mixture obtained in step b); and
   d) hydrolysing the mixture obtained in step c) at a temperature of about 100° C.;

e) termination of the hydrolysis process by adding DI water;
f) centrifugating the reaction mixture obtained in step e) at a speed of about 4000 rpm;
g) sonicating the centrifuged mixture obtained in step f); and
h) filtering the sonicated mixture and drying to obtain the nanofibers.

* * * * *